(12) United States Patent
Lawrence et al.

(10) Patent No.: US 9,082,125 B2
(45) Date of Patent: Jul. 14, 2015

(54) SYSTEM AND METHOD FOR MANAGING A TELEMARKETING CAMPAIGN

(75) Inventors: Mark Brannon Lawrence, Fayetteville, GA (US); Patrick Edward Fallon, Atlanta, GA (US); Sandy J. Diaz, Kennesaw, GA (US); Cynthia K. Hayden, Marietta, GA (US)

(73) Assignee: CC Serve Corporation, Norcross, GA (US)

( * ) Notice: Subject to any disclaimer, the term of this patent is extended or adjusted under 35 U.S.C. 154(b) by 1033 days.

(21) Appl. No.: 11/329,650

(22) Filed: Jan. 11, 2006

(65) Prior Publication Data
US 2007/0162542 A1 Jul. 12, 2007

(51) Int. Cl.
*G06F 17/30* (2006.01)
*G06F 15/16* (2006.01)
*G06Q 30/02* (2012.01)

(52) U.S. Cl.
CPC .......... *G06Q 30/02* (2013.01); *G06F 17/30699* (2013.01); *G06F 17/30899* (2013.01); *G06Q 30/0203* (2013.01)

(58) Field of Classification Search
USPC .......................................... 709/203, 217–219
See application file for complete search history.

(56) References Cited

U.S. PATENT DOCUMENTS

| | | | | |
|---|---|---|---|---|
| 5,533,103 | A * | 7/1996 | Peavey et al. | 379/69 |
| 6,189,029 | B1 * | 2/2001 | Fuerst | 709/217 |
| 6,275,940 | B1 * | 8/2001 | Edwards et al. | 726/2 |
| 6,477,575 | B1 * | 11/2002 | Koeppel et al. | 709/224 |
| 6,701,322 | B1 * | 3/2004 | Green | 707/102 |
| 6,782,091 | B1 * | 8/2004 | Dunning, III | 379/265.01 |
| 6,819,754 | B1 * | 11/2004 | Johnson et al. | 379/265.02 |
| 7,106,850 | B2 * | 9/2006 | Campbell et al. | 379/265.09 |
| 7,127,486 | B1 * | 10/2006 | Reistad et al. | 709/204 |
| 7,213,209 | B2 * | 5/2007 | Lueckhoff et al. | 715/747 |
| 7,467,135 | B2 | 12/2008 | Coker et al. | |
| 2002/0022986 | A1 | 2/2002 | Coker et al. | |
| 2002/0059283 | A1 * | 5/2002 | Shapiro et al. | 707/100 |
| 2003/0046101 | A1 * | 3/2003 | Dow | 705/1 |
| 2003/0093533 | A1 * | 5/2003 | Ezerzer et al. | 709/227 |
| 2004/0080535 | A1 * | 4/2004 | Lueckhoff et al. | 345/758 |
| 2005/0071360 | A1 | 3/2005 | Crapp et al. | |
| 2005/0086220 | A1 * | 4/2005 | Coker et al. | 707/4 |
| 2005/0177380 | A1 * | 8/2005 | Pritchard et al. | 705/1 |
| 2005/0220290 | A1 * | 10/2005 | Ambrose et al. | 379/266.07 |

(Continued)

FOREIGN PATENT DOCUMENTS

| | | | |
|---|---|---|---|
| EP | 1422651 | | 5/2004 |
| WO | WO 0147227 | * | 6/2001 |

OTHER PUBLICATIONS

"Extended European Search Report", European Patent App No. 07710024.6;.Filed Jan. 2006; SLG. EPO; Mailed Dec. 15, 2010.
"Office Action", EPO Application No. 12154070.2; Filed Feb. 6, 2012; SLG. EPO.D1; Mailed Dec. 4, 2012.

(Continued)

*Primary Examiner* — Linglan Edwards
(74) *Attorney, Agent, or Firm* — Philip H. Burrus, IV

(57) ABSTRACT

A system and a method for managing a solicitation campaign are disclosed. A solicitor provides a solicitation center with pages of personalized script, which are generated using a first script template. The solicitor receives solicitee responses, analyzes the solicitiee responses, and determines whether to continue the solicitation campaign using the current script template or using a second script template for subsequent solicitations.

27 Claims, 8 Drawing Sheets

(56) References Cited

U.S. PATENT DOCUMENTS

2006/0013380 A1* 1/2006 Yoshizawa .............. 379/265.02
2007/0016474 A1* 1/2007 Kannan et al. ................. 705/14

OTHER PUBLICATIONS

"Extended European Search Report", EPO Application No. 12154070.2; Filed Feb. 6, 2012; SLG.EPO.D1; Mailed Apr. 10, 2012.

* cited by examiner

414

| SOLICITATION ID (802) | STATUS CLASSIFICATION (804) | SCRIPT ID (806) |
|---|---|---|
| 1 | ACCEPTED | 1 |
| 2 | DECLINED | 1 |
| 3 | CALL BACK | 2 |
| ⋮ | ⋮ | ⋮ |
| N | UNANSWERED | 1 |

| SCRIPT TEMPLATE ID (1202) | ACCEPTANCE (1204) | REJECTED (1206) |
|---|---|---|
| 1 | 500 | 300 |
| 2 | 300 | 400 |
| 3 | 100 | 400 |
| ⋮ | ⋮ | ⋮ |
| N | X | Y |

FIG. 12

SYSTEM AND METHOD FOR MANAGING A TELEMARKETING CAMPAIGN

TECHNICAL FIELD

The present invention is generally related to telemarketing and, more particularly, is related to a system and method for selectively providing telemarketers with confidential information.

BACKGROUND OF THE INVENTION

Today many industries including service-provider solicit prospective clients, which hereinafter will be referred to as solicitees, using telemarketers. Typically, a service-provider will provide a telemarketer with a list of telephone numbers for solicitees and a "script" for the telemarketer to follow when soliciting a solicitee. The list is provided to a "dialer," which calls the telephone numbers in the list, and when the call is answered, the dialer transfers the call to an agent of the telemarketer and may provide the agent with the script. The agent then reads the script to the solicitee.

In some situations, the service-provider also provides the telemarketer with data files for the solicitees, and frequently, the data files include private information about the solicitee. Modern dialers are adapted to store the data files and provide the agent with information from the data files. Typically, the information from the data files will be included in the script read by the agent. For example, a dialer might call a telephone number that is associated with a solicitee, a Mr. Smith, and when the call is answered, the dialer may provide the agent with a script that includes information from Mr. Smith's data file.

Marketing forces push the service-provider into providing the private information to the telemarketer so that the agents can use a "personalized" script. In addition, in some situations, the agents confirm the accuracy of the private information. For example, a credit provider might solicit people that it has "pre-approved", wherein the people are pre-approved subject to confirmation of information that the credit provider has used to determine that the people have the appropriate credit score. Thus, the credit provider might provide the telemarketer with private information such as financial information, social security number, etc. of the people it is soliciting so that the private information can be verified before the application is submitted. A problem associated with providing the telemarketer with the private information is making certain that the information is kept secure.

In a telemarketing campaign of today, the service-provider or a "script developer" develops a script for the telemarketing campaign. The script is then provided to a telemarketer, who uses the script to solicit solicitees. However, the service-provider or "script developer" is not provided with information that the service-provider or "script developer" can use to interpret the success of the script. Thus, another problem with current telemarketing systems is that there is no real-time control of a telemarketing campaign.

Thus, a heretofore unaddressed need exists in the industry to address the aforementioned deficiencies and inadequacies.

SUMMARY OF THE INVENTION

Embodiments of the present invention provide a system and a method for selectively providing private information about a solicitee.

Briefly described, in architecture, one embodiment of the system, among others, can be implemented as follows. The system includes a first server that is in communication with a solicitation center via communication link. The first server provides the solicitation center with pages of personalized script and receives solicitee responses from the solicitation center, wherein the solicitee responses include responses by solicitees to a solicitation corresponding to a first script template. A second server is configured to receive the solicitee responses and analyze the solicitee responses. The second server is further configured to determine whether to use a second script template to generate pages of personalized script based at least in part on the analysis of the solicitee responses. In response to determining to use the second script template and in response to subsequent requests received via the communication link, the first server provides the solicitation center with pages of personalized script that correspond to the second script template. Alternatively, in response to determining not to use the second script template and in response to subsequent requests received via the communications link, the first server provides the solicitation center with pages of personalized script that correspond to the first script template.

Embodiments of the present invention can also be viewed as employing programming embodied in computer-readable medium. In one embodiment, among others, the computer-readable medium can be broadly summarized as including an analyzer module configured to analyze solicitee responses; a selector module configured to select a script template from a plurality of script templates, wherein each script template is identified by a script template identifier; and a script renderor configured to receive the selected script template and use at the selected script template to generate a page of script.

Embodiments of the present invention can also be viewed as providing methods of selectively providing solicitee data to a telemarketer. In this regard, one embodiment of such a method, among others, can be broadly summarized by the following steps: analyzing solicitee responses; selecting a script template from a plurality of script templates, wherein each script template is identified by a script template identifier; and using at the selected script template to generate a page of script.

Another embodiment of such a method, among others, can be broadly summarized by the following steps: receiving solicitee responses via a communication link, wherein the solicitee responses include responses by solicitees to a solicitation corresponding to a given script template; analyzing solicitee responses, wherein the solicitee responses are received over; determining whether to use a second script template to generate pages of personalized script based at least in part on the analysis of the solicitee responses; responsive to determining to use the second script template, using the second script template in the generation of pages of personalized script, wherein the pages of personalized script are generated in response to requests received through the communication link; and responsive to determining to not use the second script template, using the first script template in the generation of pages of personalized script, wherein the pages of personalized script are generated in response to requests received through the communication link.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 8 is a block diagram of a status table.

FIG. 12 is a block diagram of a solicitation response file.

DETAILED DESCRIPTION

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 1:
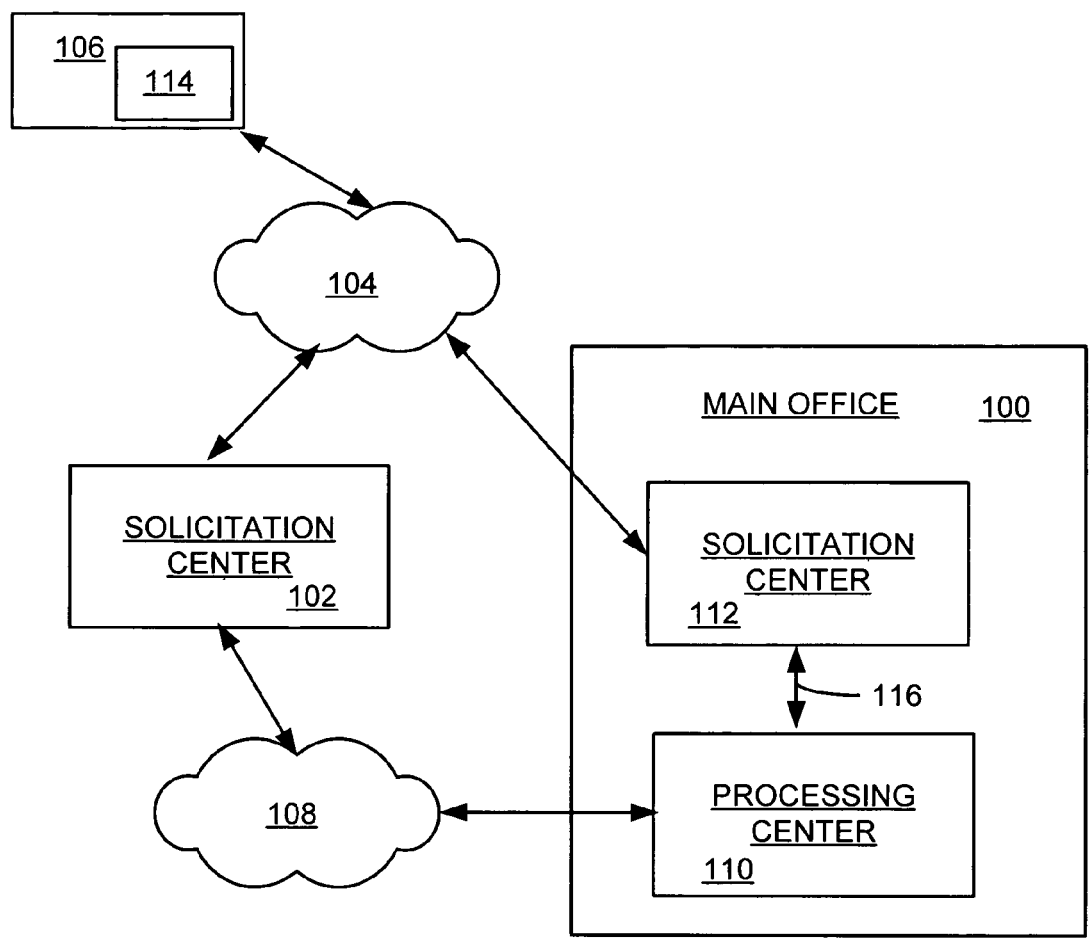
FIG. 1 is a block diagram of a system for soliciting solicitees.

Referring to FIG. 1, a main office 100 of an entity such as a service-provider is in communication with a solicitation center 102 via a network 108. The solicitation center 102 calls individuals, organizations, businesses, etc. on behalf of the service-provider and solicits the called individuals, organizations, businesses, etc. to become clients or service-recipients of the service-provider. The individuals, businesses, organizations, etc. are hereinafter referred to as solicitees 106. The solicitation center 102 calls the solicitees 106 via a telephone network 104. It should be noted that the intended scope of the present invention is to include other entities beyond service-providers and that service-providers are used only for the sake of clarity. Hereinafter, the term "solicitor" shall be used to describe the entity having the main office 100.

In some embodiments, the solicitor is a provider of credit. Consequently, the solicitation center 102 will gather information from the solicitees 106 that the solicitees 106 will want to remain confidential or private. For example, the private information might include name, address, information related to income and/or wealth, social security number, driver's license number, etc. As will be explained in detail hereinbelow, private information is selectively provided to the solicitation center 102 on a as-needed basis.

In some embodiments, the solicitation center 102 and solicitor communicate over the network 108 employing internet protocols such as, but not limited to, TCP/IP. However, so as to help protect the privacy of solicitees, the network 108 can be a secure network, and consequently, in some embodiments, the network 108 is a secure network such as a Virtual Private Network (VPN). In other embodiments, the solicitor and the solicitation center 102 are in communication over a secure communication link such as a dedicated link.

The main office 100 of the solicitor may also include a processing center 110 and a solicitation center 112. The solicitation center 112 and the processing center 110 are in communication via a communication link 116, which is typically a secure link such as a dedicated communication link. The solicitation center 112 is also in communication with the telephone network 104.

The processing center 110 receives communications from, and provides communications to, the solicitation center 102 via the network 108, and similarly, receives communications from, and provides communications to, the solicitation center 112 via the communication link 116. As will be explained in detail hereinbelow, the main office 100 of the solicitor provides the solicitation center 102 and the solicitation 112 with "solicitation files." The solicitation center 102 and the solicitation center 112 use their respective solicitation file to call telephone numbers of telephones 114 that belonging to or are associated with solicitees 106. When a telephone 114 is answered, the processing center 110 provides the solicitation center that dialed that telephone with information regarding the solicitee associated with that telephone.

In some embodiments, the solicitation center 102 and the solicitation center 112 may be functionally equivalent. Thus, in some embodiments, the types of information and the manner in which the information is provided to the solicitation centers 102 and 112 may be very similar or the same. However, in some embodiments, the solicitation center 112 may be entrusted with confidential information of solicitees because it may be owned and/or operated by the solicitor (service-provider).

Furthermore, in some embodiments, the processing center 110 accumulates campaign statistics from the communications from the solicitation centers 102 and 112. The processing center 110 is adapted to analyze the campaign statistics and can be configured to exchange the current script for the campaign for another script, modify the existing script, etc. After the processing center has exchanged/modified/etc. the script for a telemarketing campaign, future pages of script provided to the solicitation centers 102 and 112 will correspond to the new script.

It is to be understood that in some embodiments, the main office 100 does not include a solicitation center 112. Furthermore, in some embodiments, the solicitation center 102 might be owned or operated by or controlled by an entity other than the solicitor. Thus, in some embodiments, the solicitor 100 "out sources" solicitation of solicitees 106 to another entity. Furthermore, in some embodiments, the main office 100 is remote from the solicitation center 102. For example, the main office 100 could be located in Atlanta, Ga., and the solicitation center 102 might be located in another state within the United States of America or could be located in another country.

Figure 2:
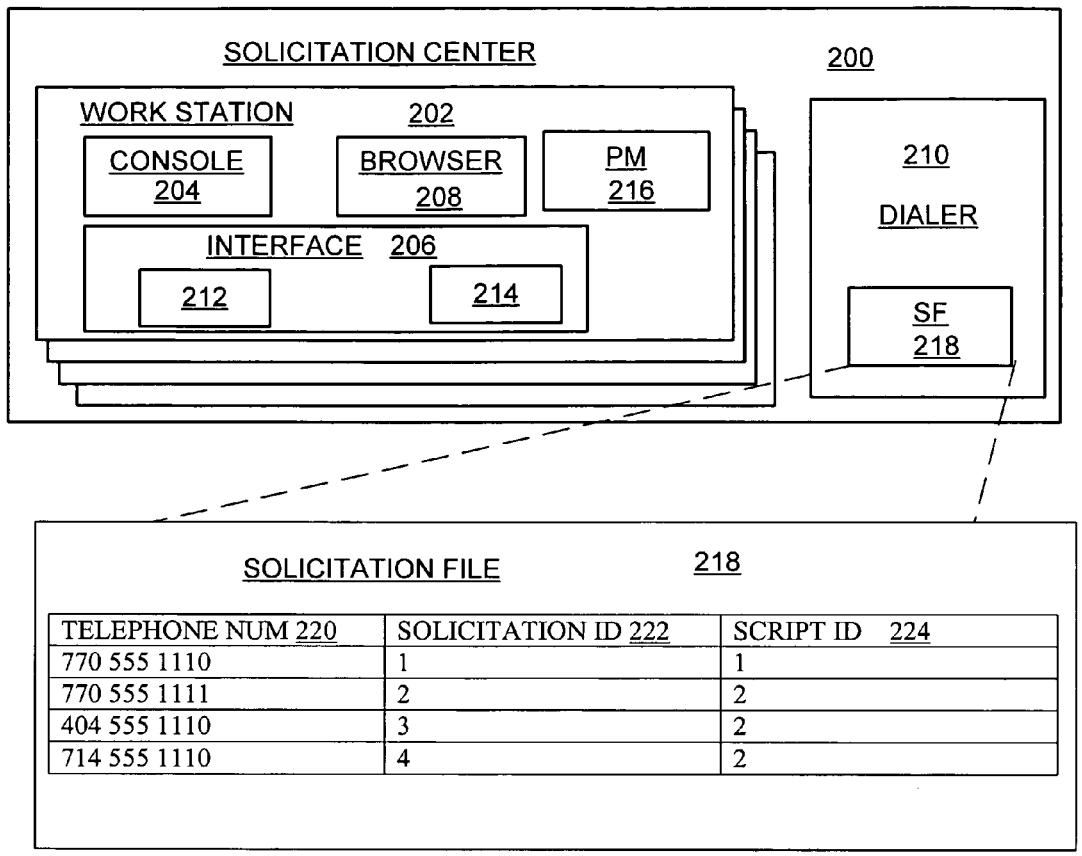
FIG. 2 is a block diagram of a solicitation center of FIG. 1.

FIG. 2 illustrates a solicitation center 200, which is exemplary of the solicitation centers 102 and 112. The solicitation center 200 includes plurality of work stations 202 and an automatic dialer 210. A work station 202 includes a console 204, an interface 206, a browser 208, and a privacy module 216. The browser 208 displays information on the console 204. The interface 206 typically includes a telephone 212 or a telephone head-set and an input device 214 such as a key-board or key-board and mouse combination. An agent (not shown) uses a work station to communicate with solicitees 106 and with the processing center 110.

In some embodiments, the work station 202 and the processing center 110 communicate over network 108. In that case, the privacy module 216 can be implemented to encrypt and decrypt communications between the work station 202 and the processing center 110.

Typically, the browser 208 is a standard browser for displaying "web pages" such as, but not limited to, HyperText Markup Language (HTML) and/or Standard Generalized Markup Language (SGML) web pages. The browser receives information from the processing center 110 and displays the information on the console 204. If needed, the privacy module 216 first decrypts the information, and then the browser 208 displays the decrypted information. The browser 208 also allows the agent to input information using the input device 214. If needed, the privacy module 216 encrypts the inputted information and then encrypted information is sent to the processing center 110. For example, in some situations, the browser displays confidential information such as the social security number of the solicitee. The agent confirms that the information is correct, and then communicates the information back to the processing center 110.

Among other things, the automatic dialer 210 includes a solicitation file 218. The solicitation file 218 includes telephone numbers 220 of the telephones 114 of the solicitees 106. For each solicitee 106 there is a solicitation identifier 222, which is included in the solicitation file 218 and which is unique to the solicitee 106. The solicitation identifier 222 for a particular solicitee 106 is associated with the telephone number 220 of that particular service-recipient 106. Thus, for example, a first solicitee has a telephone number of "770 555 1110" and a solicitation identifier of "1", and a second solicitee has a telephone number of "770 555 1111" and a solicitation identifier of "2". In some situations a solicitee might have more than one telephone number, and consequently, in some embodiments, the solicitation file 218 may include multiple telephone numbers 220 for a given solicitee 106 and each of those telephone numbers will be associated with the same solicitation identifier 222 for that given solicitee. In other embodiments, each of the telephone numbers for a given solicitee, who has more than one telephone number, will be associated with a unique solicitation identifier. It should be noted that in some embodiments, the solicitation identifier 222 is the telephone number 220.

In some embodiments, the solicitation file 218 also includes script identifiers 224. Typically, the script identifiers 224 are associated with telephone numbers 220. Thus, for example, the solicitee 106 having the telephone number "770 555 1110" will hear an agent read a particular script that is associated with the script identifier 224 having the value of "1". Whereas, the solicitees 106 having the telephone numbers "770 555 1110", "770 555 1111", "404 555 1110" and "714 555 1110" will hear the agent read a second particular script that is associated with the script identifier 224 having the value of "2". As will be explained in detail hereinbelow, the script that a solicitee hears includes both "personalized information" that is specific to the solicitee and generic information that is included in all scripts having the same script identifier. Furthermore, it should be noted that in some embodiments, the solicitation file 218 includes a single script identifier, and every solicitee 106 hears the same script, except for "personalized information."

Figure 3:
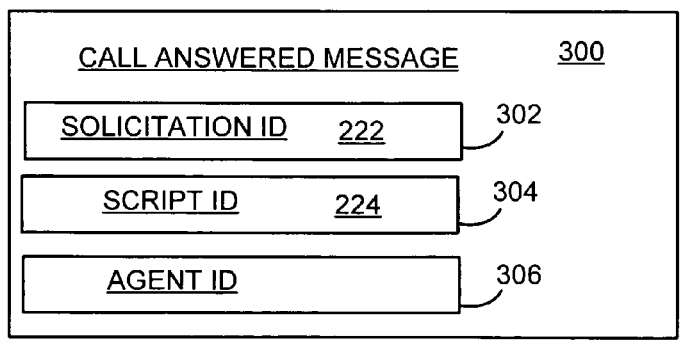
FIG. 3 is a block diagram of a Call-Answered message.

The automatic dialer 210 calls the telephone numbers 220 in the solicitation file 218. When one of the called telephones 114 is answered, the automatic dialer transfers the telephone call to a workstation 202 and sends a Call-Answered message 300 to the processing center 110, which is illustrated in FIG. 3. Among other things, the Call-Answered message 300 includes multiple fields 302, 304, and 306 for carrying information. The field 302, solicitation identifier field, carries the solicitation identifier 222. The field 304, script identifier field, carries the script identifier 224, and the field 306, agent identifier field, carries an agent identifier that is associated with the agent to whom the call has been transferred. The agent identifier might be the telephone number of the work station 202 where the agent is working or some other type of identifier. The fields 302, 304, and 306 are merely exemplary and are intended as non-limiting examples of the information carried in a Call-Answered message. In some embodiments, the Call-Answered message 300 might include fewer, the same number, or more fields.

It should be noted that in one embodiment, the browser 208 receives a page of script only after the dialer 210 has sent the Call-Answered message 300. Consequently, the solicitation center 200 receives private information regarding solicitees on a as-needed basis. If the telephone call from the dialer 210 to the telephone 114 is unanswered, then the solicitation center 200 has no need for the private information of the called solicitee, and consequently, the solicitation center does not receive the private information of the called solicitee, i.e., the solicitee's private information is not received at the solicitation center until after the solicitee has answered his or her telephone. Furthermore, in some embodiments, private information received from the processing center 110 is not stored in a permanent memory located at the solicitation center 200. In one preferred embodiment, when a page of script received by the browser 208, the page is buffered in a memory (not shown) and the page is overwritten in the memory by a subsequent page. Thus, private information regarding called solicitees in not permanently stored at the solicitation center 200.

Figure 4:
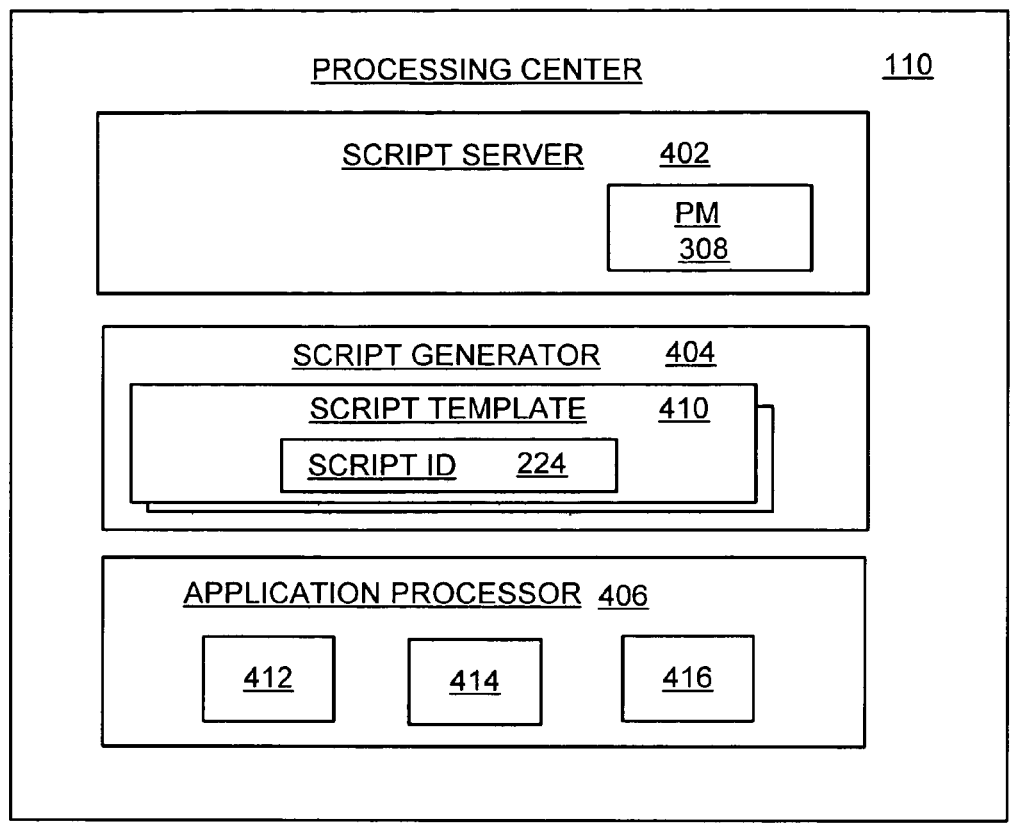
FIG. 4 is a block diagram of a processing center of FIG. 1.

FIG. 4 illustrates the processing center 110. The processing center 110 includes a script server 402, a script generator 404, and a application processor 406. Typically, the script server 402, script generator 404, and application processor 406 are tiered with the script server 402 being the outermost tier and the application processor being the innermost tier. In that case, the script server 402 is the only component that is accessible from outside of the processing center 110, and the application processor 406 is not directly accessible by the script server 402 because the script generator 404 is interposing the script server 402 and the application processor 406.

The application processor 406 includes solicitee data files 412 and status tables 414. In some embodiments, the application processor 406 also includes a campaign controller 416. The campaign controller module 416 includes logic for, among other things, analyzing the effectiveness of a script. In one embodiment, the campaign controller module 416 is configured to select a given script template and provide the selected script template to the script generator. Each of the solicitee data files 412 include data about one solicitee. The status file 414 includes the current status of solicitee's, e.g., whether a solicitee has accepted or declined an offer.

The script server 402 includes a privacy module 408, which is similar to or the same as the privacy module 216. In some situations, some of the information passed between the script server 402 and the work station 202 is private information. Thus, in some embodiments, private information that is passed between the script server 402 and work station 202 is encrypted/decrypted by the privacy module 402. Furthermore, the script server 402 is configured to allow agents at the work stations 202 to log into the script server 402 and deny access to those who cannot properly log into the script server 202.

Among other things, the script server 402 provides the work stations 202 with information that the browser 208 displays on the console 204. Typically, the script server 402 is configured as a web server and the information passed to the work station 202 is carried in the form of a "web page." The script server 402 can also be configured to provide the dialer 210 with the solicitation file 218.

Typically, the script server 402 receives the Call-Answered message 300 from the automatic dialer 210, parses information from the Call-Answered message 300, and provides the script generator 404 with at least some of the information included in the Call-Answered message 300. Responsive to providing the script generator 404 with information included in the Call-Answered message 300, the script server 402 receives a page of script, which is normally in the form of a web page, from the script generator 404, and provides the browser 208 with the page of script. The script server 402 is also adapted to receive information "communicated" from the browser 208.

In one embodiment, the text of the script is displayed by the browser, and the agent reads the text of the script and confirms the accuracy of information included in the text. If necessary, the agent uses the browser 208 to change information that is included in the page of script. Once the agent has confirmed the accuracy of the information contained in the page of script and/or corrected erroneous information, the agent clicks enter, and the confirmed/updated information is "communicated" to the script generator. Typically, the "communicated" information includes an identifier such as the solicitation identifier 222. The script server 402 provides the script generator 404 with the communicated information.

The script generator 404 provides the script server 402 with the information that is provided to the work station 202. Typically, the script generator 404 is configured as an application server that can generate web pages. The script generator 404 includes multiple script templates 410. The script generator 404 uses a script template 410 and information from the application processor 406 to generate a script, which is normally carried in a web page. The script is then provided to the script server 402, which then provides the script to a work station.

The script template 410 includes the script identifier 224, which identifies the script template 410. In some embodiments, the script template 410 might also include other identifiers such as a solicitation-campaign identifier (not shown) and/or version identifier (not shown). In some situations, the solicitor might be running several concurrent solicitation campaigns, and in that case, the script templates might include the campaign identifier. As those skilled in the art will recognize, if a version identifier and/or solicitation-campaign identifier are used to help identify a particular script template, then the solicitation file 218 can also include the appropriate information as can the Call-Answered message 300. In other words, in some embodiments, the script identifier 224 includes a solicitation-campaign identifier and/or a version number. In other embodiments, the processing center includes a script look-up table for identifying a script template, wherein script templates are associated with solicitation identifiers.

The script template 410 also includes code or macros or scripts or other programming for creating hyper-links, buttons, pull-down tabs, etc. Thus, when the script generator 404 generates a page of script, the page may include hyper-links, buttons, pull-down tabs, etc.

Typically, the script generator 404 receives from the script server 402 the script identifier 224 and the solicitation identifier 222 that were included in Call-Answered message 300. The script generator 404 uses the script identifier for, among other things, identifying a particular script template 410 and uses the solicitation identifier 222 for retrieving a particular solicitee data file 412 from the application processor 406. The script generator 404 uses information from the retrieved solicitee data file 412 to populate fields in the particular script template so as to generate a script, or a page of script, which is typically in the form of a web page. The script generator 404 then provides the script to the script server 402, which then provides the script to the browser 208.

Typically, the script generator 404 provides the script server 402 with multiple pages of script. The script generator 404 provides the first page of script in response to receiving information contained in the Call-Answered message 300. In one embodiment, subsequent pages of script are generated in response to receiving "communicated" information from the browser 208. Upon receiving the "communicated" information, the script generator 404 updates, if necessary, the solicitee data file 412.

Figure 5:
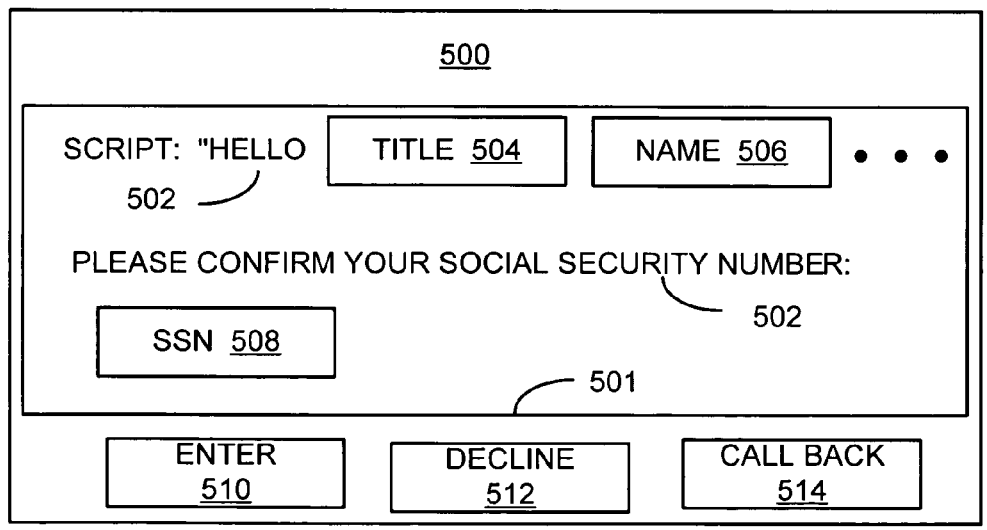
FIG. 5 is a block diagram of a page of script.

FIG. 5 illustrates a page 500 of an exemplary script. The page 500 includes text 501 that is comprised of generic text 502 and multiple fields 504, 506, and 508. The fields are populated by the script generator 404 using information from the service-recipient data information 412 retrieved from the application processor 406. Thus, the fields are populated with specific information that is generally related to the solicitee such that the fields carry "personalized information". For example, field 504 carries a title such as "Mister," "Miss," "Misses," "Doctor," etc. of the solicitee; field 506 is populated with the name of the solicitee, and field 508 is populated with the social security number of the solicitee. Typically, the fields 504, 506, and 508 are editable by the agent using the browser 208. In other words, the agent can use the input device 214 to add, change, delete information carried in the fields. In some situations, when a page is generated by the script generator 404, the page may include blank fields that do not carry any initial information, and the agent then collects information from the solicitee and puts that information into one or more of the blank fields. Thus, an agent can confirm the accuracy of the information carried in the fields by conversing with the solicitee and collect new information.

The page 500 also includes a button 510, a button 512, and a button 514. The button 512 is a "Decline" button. If at any time during the solicitation, the solicitee decides that he does not want the goods or service of the solicitation, or he/she hangs-up, or otherwise terminates the telephone call with the agent, the agent may "click" on the "Decline" button 512. Similarly, the button 514 is a "Call Back" button. If the solicitee requests that the agent call-back at another time, the agent clicks on the "Call Back" button 514. The button 510 is an "Enter" button.

It should be realized that during a solicitation of a given solicitee, an agent may read multiple pages of script to the given solicitee. Thus, in some situations, information, which includes gathered information and confirmed information, is communicated from the solicitation center to the processing center on a "page-by-page" basis each time the agent clicks on one of the buttons 510, 512, 514. In other words, when an agent has finished with a current page of script, the agent requests another page by clicking on the appropriate button (510, 512, 514) and information included in the current page is communicated to the processing center 110. Typically, the communicated information includes an identifier for associating the communicated information to a specific solicitee so that, among other things, the solicitee data file 412 for the specific solicitee is updated. Communicated information is also used to update other files and tables such as the status table 414.

In some embodiments, information regarding a specific solicitee may be communicated from the solicitation center to the processing center at the end of the solicitation of the specific solicitee. Furthermore, in other embodiments, the solicitation center may collect information regarding multiple solicitees and then communicate the collected information at one time. Thus, the invention is not limited to communicating information on a "page-by-page" basis.

Figure 6:
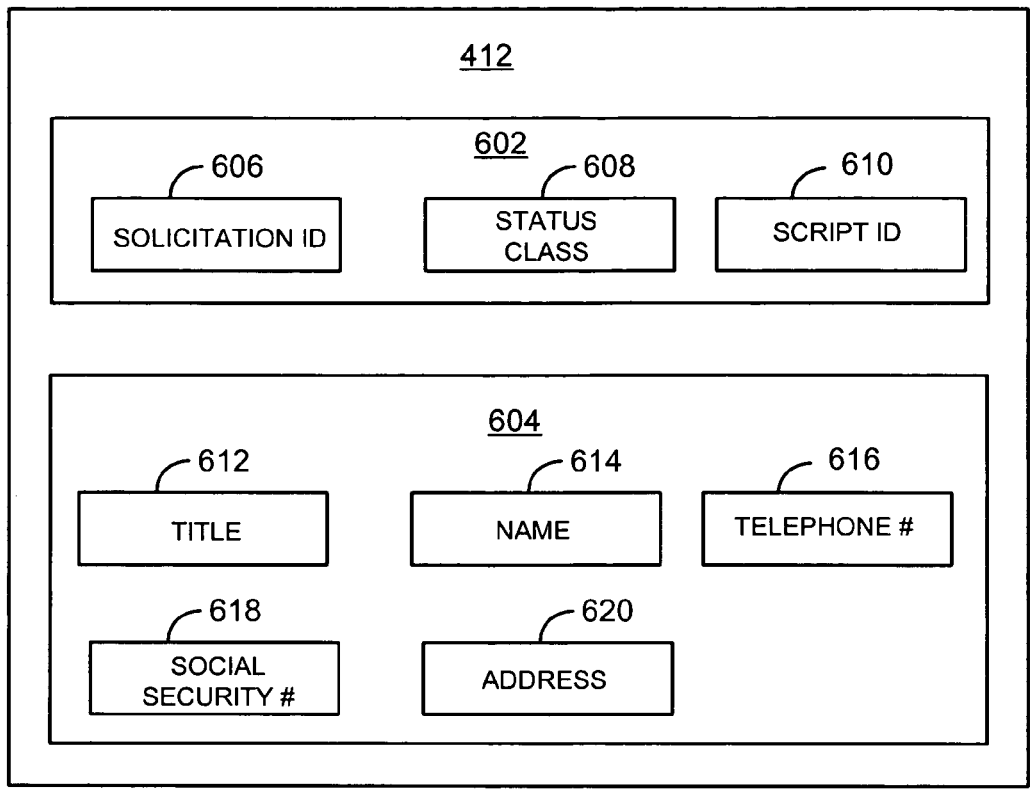
FIG. 6 is a block diagram of a solicitee data file.

Referring to FIG. 6, the solicitee data file 412 includes solicitor information 602 and recipient information 604. The solicitor information 602 includes multiple fields 606 and 608. Typically, field 606 is a solicitation identifier filed for carrying the solicitation identifier 222, and field 608 is a status field for carrying the current status classification. Non-limiting examples of status classification include "Not Yet Called", "No Answer", "Accepted", "Declined", "Requested Call Back." In one embodiment, the status classification is updated by the script generator 404 at the end of a solicitation with a solicitee. Thus, if the solicitee accepts the service, then when the agent clicks the enter button 510 on the last page of the script, the status classification is updated to "Accepted". Whereas, if the agent has clicked on the "Decline" button 512 or "Call Back" button 514, then the status classification is updated to "Declined" or "Requested Call Back," respectively. Typically, the status classification is initially set to "Not Yet Called" when the solicitee data file is created. In other embodiments, the status file might not be empty when a telemarketing campaign is initiated, and as solicitee responses (accepted or declined) are received, the status file is updated to include the solicitation identifier for a contacted solicitee and the solicitee's response.

In some embodiments, the solicitee data file 412 includes a script identifier field 610 for carrying the script identifier 224. Thus, in this embodiment, the solicitation file 218 does not have to include the script identifier because the script generator 404 can determine the script identifier 224 from the script identifier field 610.

The recipient information 604 includes multiple fields 612, 614, 616, 618, and 620 for carrying personal information about the solicitee. For example, fields 612 and 614 carry the "title"—Mr., Mrs., Dr., Ms, etc.—and the name of the solicitee. Fields 616 and 618 may carry the telephone number and the social security number of the solicitee, respectively, and field 620 may carry the address of the solicitee. It should be noted that the fields 606-620 are merely representative of the type of fields that could be included in a solicitee data file 412 and that they are provided as a non-limiting example of possible fields.

In some embodiments, the dialer 210 sends a progress report to the processing center 110. The progress report may include the solicitation identifiers 222 associated with telephones that have not yet been called and/or may include solicitation identifiers 222 associated with telephones that have been called but not answered and/or may include solicitation identifiers 222 associated with telephones that have been called and answered. Typically, telephones that have not yet been called have a first flag associated with them, called but unanswered telephones may have a second flag associated with them, and called and answered telephones may have a third flag associated with them. The script generator 404 may use the progress report to update the respective solicitee data files 412 and the status table 414.

Figure 7:
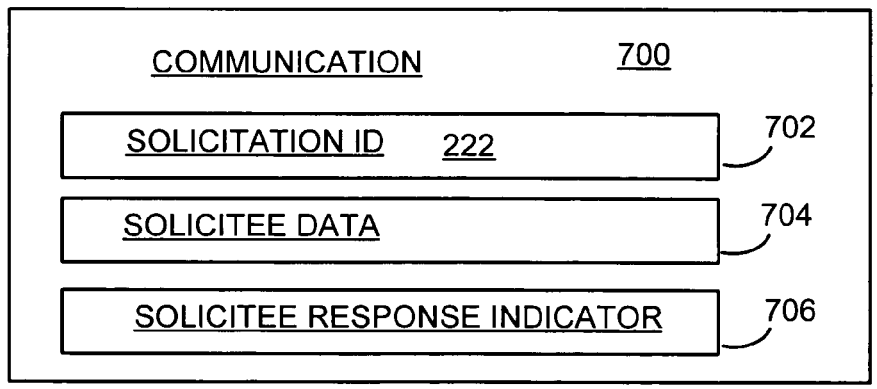
FIG. 7 is a block diagram of a communication from a solicitation center.

FIG. 7 illustrates a communication 700 from one of the solicitation centers to the processing the center. It should be noted that the illustrated communication 700 is merely exemplary and other communications could carry other information such as the script template identifier 224. In some embodiments, the communication 700 is generated by the browser 208, but in yet other embodiments, the communication 700 is generated by a communication module (not shown). Furthermore, in some embodiments, the communication 700 is processed by the privacy module 216 before being transmitted to the processing center and processed by the privacy module 308 at the processing center.

The communication 700 includes an identifier 702. Typically, the identifier 702 is a solicitation identifier 222. The processing center uses the identifier 702 to, among other things, identify a solicitee data file 412 and to update system files and tables. The communication 700 also includes solicitee data 704. The solicitee data 704 is information that has been gathered and/or confirmed by an agent. Using the identifier 702, a specific solicitee data file 412 is updated to correspond to the solicitee data 704. The communication 700 can also include a solicitee response indicator 706. The solicitee response indicator 706 generally indicates whether the solicitee has accepted or declined the solicitation. However, the solicitee response indicator 706 can also carry other information such as a request that the solicitee be contacted at a later date, i.e., call back later.

It should be noted that in some embodiments, the processing center 110 can determine whether or not a solicitee has accepted or declined a solicitation even when the communications 700 from the solicitation centers do not include a solicitee response indicator. For example, in some situations, the pages of script that are read to a solicitee comprise an application such as, but not limited to, a credit application, service application, etc. The process for approving the application can be configured such that unless the solicitee must provide a complete application. Thus, unless the agent communicates all of the applicant's information to the processing center, the solicitee's application is incomplete, and an incomplete application may be defined as a rejection of the solicitation. Thus, in one embodiment, the application processor 406 includes checks to see if the communications from an agent comprises a complete application, and if so, the application processor determines that the solicitee has accepted an offer, and if not, the application processor determines that the solicitee has declined an offer.

An exemplary status table 414 is illustrated in FIG. 8. The status table 414 includes columns 802, 804, and 806. Listed in column 802 are solicitation identifiers 222. Listed in column 804 is the current status classification associated with the solicitation identifiers. Thus, the service-recipient associated with the solicitation identifier 222 having the value of "1" has accepted the service, and the service-recipient associated with solicitation identifier having the value of "2" has declined to accept the service, and so on. The column 806 lists the script identifiers that are associated with each of the solicitation identifiers. The script identifier associated with a given solicitation identifier identifies the script template that corresponds to the script read to the solicitee associated with the given solicitee. Again, it should be remembered that the script template identifier can be used to a solicitation campaign, a script template, and a version number or any combination thereof. For example, a script identifier that identifies campaign, script, and version could have the format of "xxx.yyyy.zzz", where "xxx" is used to identify a solicitation campaign, "yyy" is used to identify a script template, and "zzz" is used to identify a version of the script template.

The status table 414 is used in managing solicitation campaigns. In one embodiment, the script generator 404 uses the status table 414 in preparing a new solicitation file 218. For example, when the script generator 404 prepares a new solicitation file 218, the script generator 404 does not include the solicitation identifiers and the associated telephone numbers for service-recipients that have either already accepted or declined the service or goods that is being marketed in the campaign. Thus, solicitees who have already accepted or declined the solicitation will not be called again when the new solicitation file is used to call solicitees.

Figure 9:
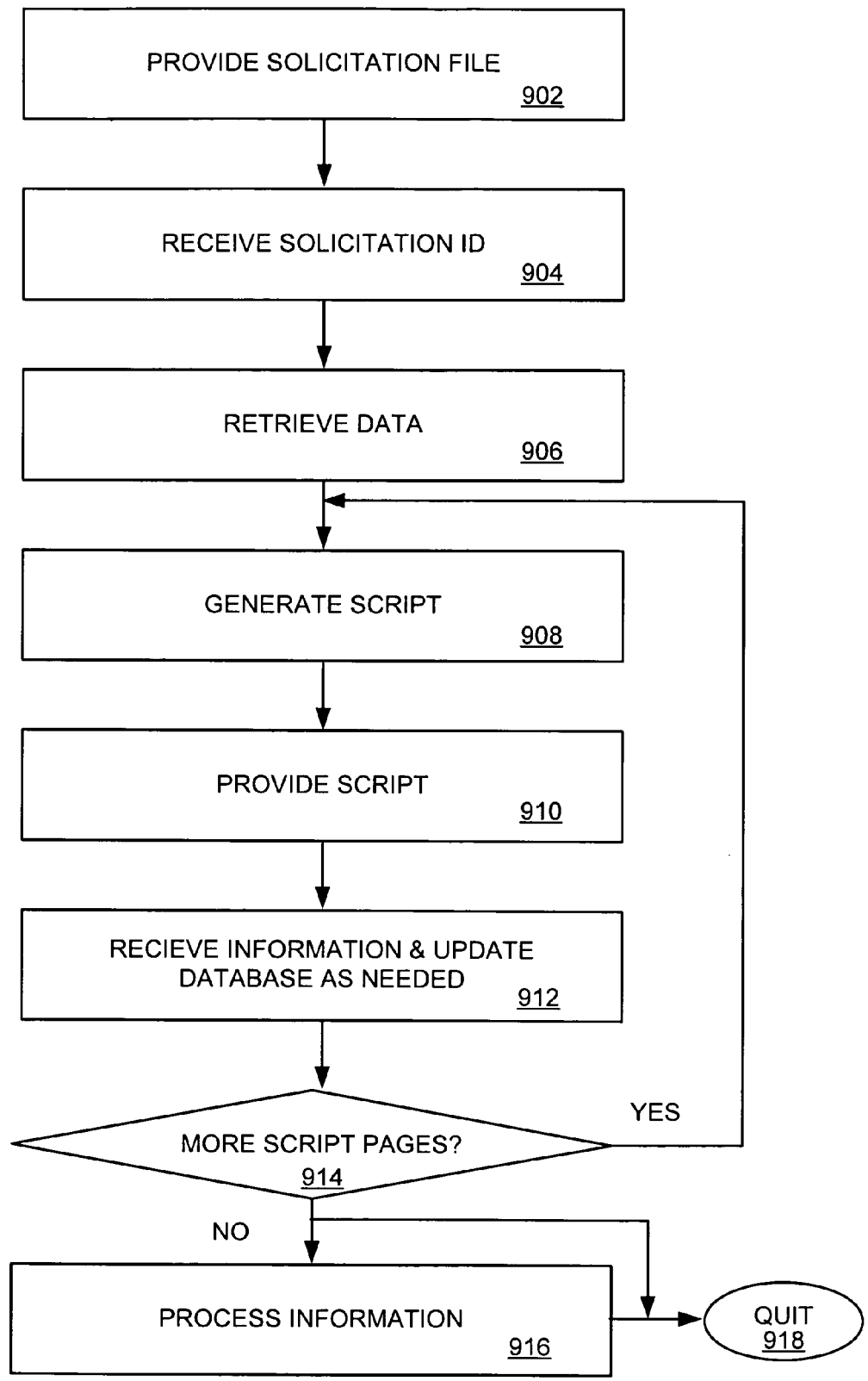
FIG. 9 is a flow chart for selectively providing a telemarketer with solicitee data.

FIG. 9 is an exemplary flow chart of steps taken at the processing center 110. In step 902, the processing center provides the solicitation center 200 with the solicitation file 218. At the solicitation center 200, the dialer 210 uses the solicitation file 218 to call the telephones 114 of solicitees 106. When a telephone call is answered, the dialer 210 transfers the call to the work station 202 of an available agent and sends a Call-Answered message 300 to the processing center 110.

In step 904, the processing center receives the Call-Answered message 300, which includes the solicitation identifier 222. In step 906, the processing center retrieves data from the application processor 406. Typically, the retrieved data is information that is included in the solicitee data file 412 associated with the received solicitation identifier.

In step 908, the processing center generates a page of script using at least a portion of the retrieved data. Typically, the page of script is embodied in a "web page". Next, the processing center provides the page of script to the solicitation center. At the solicitation center, the text of the page of script is provided to the agent, and the agent reads the text of the page of script to the called solicitee.

In step 912, the processing center receives information from the solicitation center. Typically, the received information is information that was already included in the previously provided page of script or is updated information, i.e., changes to the information that was included in the previously provided page of script, or is new information that the agent has collected. The received information may also include an indicator that the solicitee has declined the solicitation or has requested that the agent call-back at a later time. Based upon the received information, the solicitee data file 412 may be updated as needed.

In step 914, a determination is made on whether another page of script is needed. Typically, a single solicitation session involves the agent reading the text from multiple pages of script, and typically, the script generator 404 can determine the whether a page is the "last" page using information in the script template 410. Thus, if the "last" page of script has not been generated by the script generator 404 and another page is needed, then the process continues at step 908. Typically, a flag is set when the script generator 404 generates the last page of script so that the determination can made regarding whether there are more pages of script needed. It should be noted that no further pages are need if the solicitee has declined the solicitation or requested a call-back. In that case, the process ends at step 918.

When the last page of script has already been provided and the solicitee has not declined the solicitation or has not requested a call-back, then process continues at step 916. In step 916, the received information is processed. Typically, processing the received information includes determining whether to approve the solicitee based at least upon the received information. Thus, in some situations, the solicitor might decide not to provide the solicitee with a goods or service based upon updated information.

Figure 10:
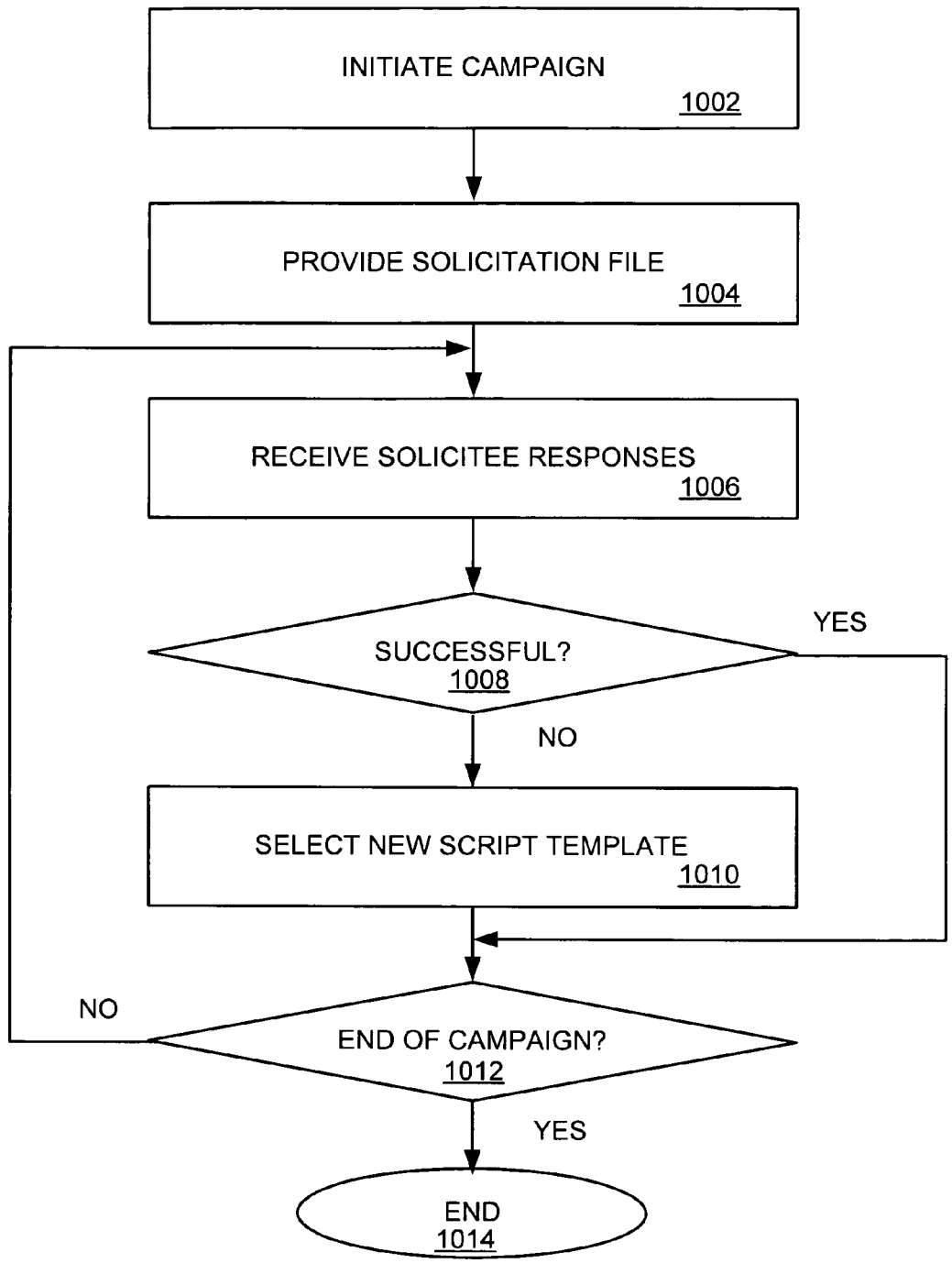
FIG. 10 is a flow chart illustrating management of a solicitation campaign.

FIG. 10 is an exemplary flow chart of steps for managing a telemarketing campaign. The steps illustrated in FIG. 10 can be performed by one or more of the components of the processing center 110.

In step 1002, a telemarketing campaign is initiated. A script template for the campaign is developed and a solicitation file for the campaign is generated.

In step 1004, the solicitation file for the campaign is provided to solicitation centers. The solicitation centers use the solicitation file to contact solicitees.

In step 1006, solicitee responses are received at the processing center. In some embodiments, a communication from a solicitation center to the processing center might include a solicitee response indicator, which indicates whether the solicitee associated with the communication has accepted or declined an offer related to the solicitation. In other embodiments, the processing center can determine whether solicitee has accepted or declined the offer by determining whether the communications for a solicitee's application are complete.

In step 1008, the processing center analyzes the solicitee responses to, among other things, determine whether the current script template for the solicitation campaign is successful. The analysis of the solicitee responses can include, among other things, the acceptance rate, i.e., the number of solicitees who have accepted divided by the number of solicitees who been contacted. Other statistical quantities can also be used to determine whether the current script template is successful. In some embodiments, an operator at the processing center is provided with results from analysis of the solicitee responses, and the operator can determine whether the current script template is successful. In other embodiments, the application processor or another component of the processing center can be configured to analyze the solicitee responses and determine whether the current script template is successful. If the current script template for the solicitation campaign is successful, then the process continues at step 1012. On the other hand, if the current script template is determined to be unsuccessful, then the process continues at step 1010.

In step 1010, a new script template for the solicitation campaign is selected. In one embodiment, the new script template is selected by an operator of the processing center. However, in other embodiments, the new script template is selected by a component of the processing center. Once the new script template is selected, it will be used to provide pages of script to the solicitation centers for subsequent solicitations.

In step 1012, the processing center determines whether the current solicitation campaign has ended. If the campaign has not ended, then the process reverts back to step 1006.

It should be noted that in some embodiments, the processing center might initiate a solicitation campaign using more than one script template. In that case, a first solicitee receives a solicitation corresponding to a first script template having a first script template identifier, a second solicitee receives a solicitation corresponding to a second script template having a second script template identifier, and so on. The solicitee responses for the solicitees are associated with script template identifier that corresponds their respective solicitations. In step 1008, the acceptance rates for the various scripts, and other factors, can be used to determine which script template is the most successful. And then, in step 1010, the most successful script template is then selected.

Figure 11:
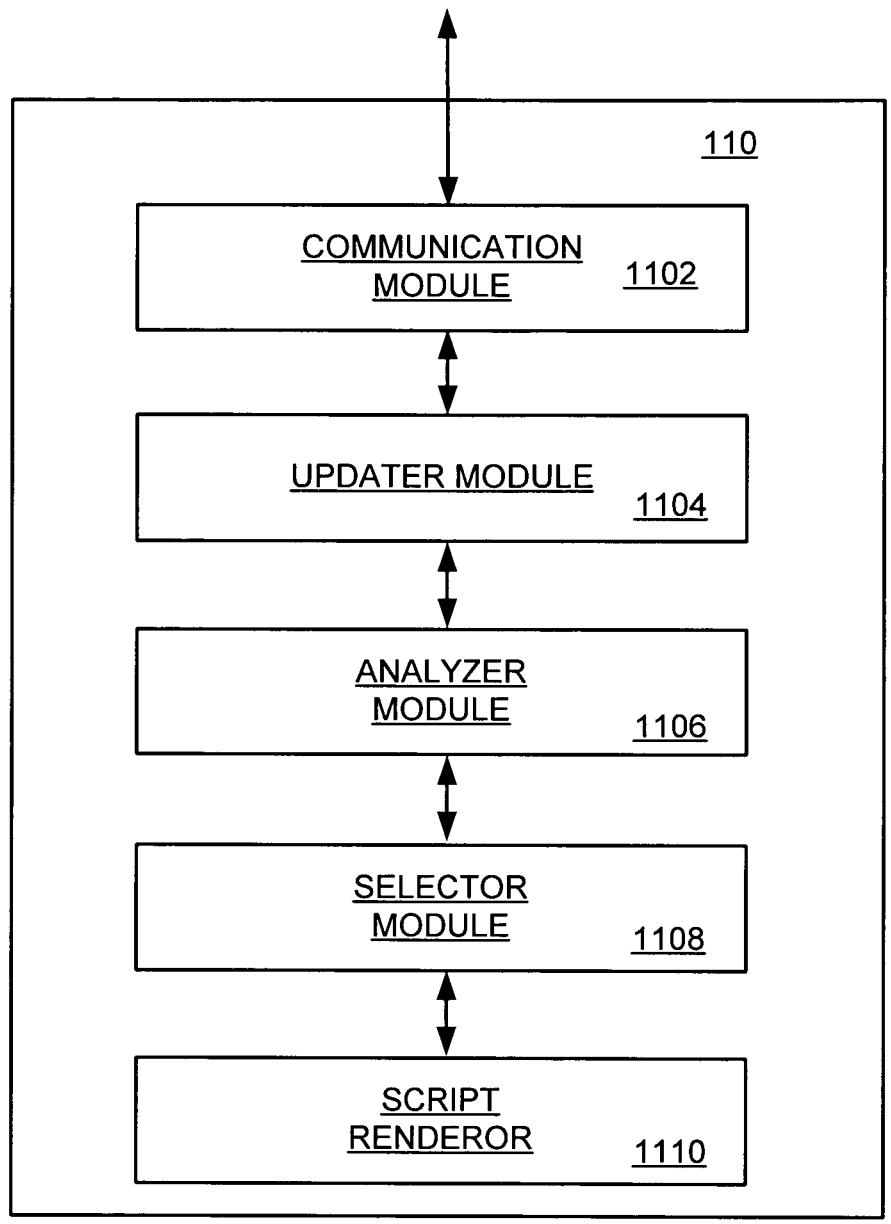
FIG. 11 is a block diagram of modules for managing a solicitation campaign.

FIG. 11 illustrates another embodiment of the processing center 110 in which selected modules are illustrate. It is to be understood that the processing center 110 might include fewer or more module and that the modules can be distributed among one or more components of the processing center. A communication module 1102 receives communications from the solicitation centers and provides the solicitation center with, among other things, pages of script and solicitation files.

An updater module 1104 receives the communications from the communication module. The update module reads the communications and updates various files and tables. For example, the updater module can update solicitee data files 412, status table 414, and a solicitation response file 1200, which is illustrated in FIG. 12. The solicitation response file 1200 includes a column of script template identifiers 1202, a column of accumulated offer-acceptance 1204 and column of offer-rejection 1206. A script template identifier 1206 uniquely identifies a script template 410. The value of the script template identifier 1206 generally corresponds to the script identifier 224. The updater module 1104 reads communications from the solicitation centers and determines whether a solicitee has accepted or rejected the solicitation. When a solicitee has accepted a solicitation, the updater modules determines the script template 410 that corresponds to the script read to the solicitee and updates the accumulated offer-acceptance for the script template identifier 1202 associated with that script template and updates the offer-rejection 1206 when the solicitee declines the offer. Typically, the updater module can determine the script template identifier 1202 from the communications 700, which can carry the script identifier 224.

However, in some embodiments, the communications 700 might not include the script identifier 224. In that case, the application processor may include a file that associates solicitation identifiers 222 with script template identifiers 1202. The updater module 1104 can use the file associating solicitation identifiers with script template identifiers 1202 to determine the script template identifier that corresponds to a script heard by a solicitee.

An analyzer module 1106 includes statistical analysis modules/routines and applies statistical analysis on the solicitation response file 1200. Among other things, the analyzer module 1106 is configured to determine acceptance rates for each of the scripts, determine whether a given acceptance rate meets or exceeds a threshold value, and statistically compares solicitation responses for different scripts.

It should be noted that in some embodiments, the analyzer module 1106 is configured to mine various files and tables to determine, among other things, accumulated acceptances and accumulated rejections for scripts. For example, in one embodiment, the status file 414 also associates a script identifier for each solicitation identifier. The analyzer module 1106 can use the status file 414 to accumulate acceptances and rejections for the various scripts.

A selector module 1108 receives statistical analysis results from the analyzer module 1106. In one embodiment, the selector module is configured to automatically select a script template 410 for the generation of subsequent pages of script. The selector module can select a new script or the current script. In some embodiments, the selector module can select a script based upon, among other things, acceptance rate. If the acceptance rate is below a predefined value, then the selector module might select another script template. And if a given interval of time, the new script template does not have a desired acceptance rate, then the selector module might select yet another script template. The selector module can also select a script template that has had the highest acceptance rate to date for the current solicitation campaign.

In yet another embodiment, the selector module 1108 is configured to provide a user interface (not shown) to an operator of the processing center. The selector module 1108 is configured to provide the user with statistical results determined by the analyzer module 1106. The operator might then use the user interface to select a new script template by providing a template selection input to the selector module 1106. The selector module 1106 will then employ the operator provided template selection input to select a script template and provide the selected script template to a script renderor module 1110.

The script renderor module 1110 receives the selected script template and uses the selected script template for the generation of subsequent pages of script. It should be noted that in one embodiment, the script renderor module 1110 is configured not switch script templates during a solicitation session. Thus, if an agent starts a solicitation session using pages of script from a first script template, the agent will continue to receive pages of script generated using the first script template even if the script renderor module 1110 has been provided with a new script template.

The modules such as, but not limited to, updater module 1104, the analyzer module 1106, and the selector module 1108 comprise one or more ordered listings of executable instructions for implementing logical functions, which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of an embodiment of the present invention includes embodying the functionality of the preferred embodiments of the present invention in logic embodied in hardware or software-configured mediums.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method of managing a telemarketing campaign, the method comprising:
   a processor located at a main office providing, via a network, a solicitation file to an automatic dialer remotely located at one or more solicitation centers, the solicitation file identifying a plurality of solicitees for a telemarketing campaign;

the processor providing, via the network, a first script template to a work station associated with the automatic dialer and remotely located at the corresponding solicitation center, the first script template to be presented to at least a first portion of the solicitees during a call initiated by the automatic dialer;

the first script template communicated to the work station on a page-by-page basis by, when a previous page has been completed at the work station, overwriting at the work station the previous page with another page in response to page requests from the work station, wherein the another page of the first script is buffered at the main office prior to the previous page being completed at the work station and communicated to the work station only after the previous page has been completed in the work station, and wherein the another page has an identifier associating the another page with the previous page;

the processor receiving, via the network from the work station, solicitee responses to the first script template from the first portion of the solicitees;

the processor analyzing the solicitee responses to the first script template from the first portion of solicitees; and based on the analysis of the solicitee responses to the first script template, the processor determining whether to provide the work station via the network the first script template or a second script template to a second portion of the solicitees.

2. The method of claim 1, wherein the network comprises a secure communication link.

3. The method of claim 1, further comprising the processor updating the first script template based on the analysis of the solicitee responses and providing an updated first script template to the work stations.

4. The method of claim 1, further comprising:
providing statistical information related to the analysis of the solicitee responses to the first script template;
receiving template selection input; and
using the template selection input in determining whether to present the first script template or the second script template.

5. The method of claim 1, further comprising:
identifying the first script template with a first script identifier;
identifying the second script template with a second script identifier;
associating solicitee responses with the first script template identifier; and
responsive to determining whether to present the first script template or the second script template, using the second script template identifier to retrieve the second script template from a database.

6. The method of claim 5, further comprising determining the first script identifier by using a look-up table.

7. The method of claim 5, further comprising determining the first script identifier from a communication received via the communication link.

8. A computer program, embodied in a non-transitory computer readable medium and executable by a processor, for managing a telemarketing campaign from a main processing center with one or more remotely located solicitation centers via a network, the computer program comprising:
a communication module that:
provides a solicitation file to an automatic dialer remotely located at the one or more solicitation centers, the solicitation file identifying a plurality of solicitees for a telemarketing campaign, at least a first portion of the solicitees to be presented a first script template;

provides the first script template to a work station associated with the automatic dialer only if the automat dialer establishes a call within one of the first portion of solicitees, the first script template provided to the work station on a page-by-page basis by, when a first page has been completed at the work station, overwriting at the work station the first page with a second page and:
providing the first page of the first script template to the work station;
buffering the second page of the first script template at the main processing center prior to the first page being completed at the work station and until the first page is completed at the work station; and
in response to the first page being completed at the work station, overwriting, at the work station, the first page with the second page; and
receives from the work station solicitee responses to the first script template from the first portion of the solicitees;

an analyzer module that:
analyzes solicitee responses to the first script template from the first portion of the solicitees; and
determines whether to provide to the work station the first script template or the second script template to a second portion of the solicitees;

a selector module that selects the first script template or the second script template from a plurality of script templates, wherein each script template is identified by a script template identifier; and a script renderor that receives the selected script template and uses the selected script template to generate the first page and the second page of script.

9. The computer program of claim 8, wherein the communication module further receives communications over a network, each communication including a solicitee response indicator, wherein for a given communication the solicitee response indicator therein indicates whether a given solicitee has responded to a given solicitation by accepting or rejecting an offer, wherein the given solicitation is related to a given script template of the plurality of script templates;
the computer program further comprising:
an updating module that updates a solicitation response table, wherein the solicitation response table comprises a script template identifier having accumulated solicitee responses associated therewith, wherein responsive to the communication module receiving the given communication, the updating module uses the solicitee response indicator that is included therein to update the accumulated solicitee response associated with the given script template;
and wherein the analyzer module further determines statistics related to accumulated solicitee responses for multiple script identifiers.

10. The computer program of claim 9, further including:
a user interface module that receives statistical information from the analyzer module, provides a user with the statistical information, and receives template selection input from the user; and
wherein the selector module employs the user supplied template selection input in the selection of the script template.

11. The computer program of claim 9, wherein the selector module receives statistical information from the analyzer module, and wherein the selecotr module employs the statistical information in the selection of the script template.

12. The computer program of claim 9, wherein the given communication includes a given script identifier, and wherein the updater module uses the given script identifier of the given communication to determine a given script template identifier and update the accumulated solicitee response associated with the given script template identifier in accordance to the solicitee response indicator of the given communication.

13. The computer program of claim 12, wherein the given communication includes a solicitation identifier, and wherein the updater module uses the solicitation identifier to determine a particular script template identifier.

14. The computer program of claim 9, wherein the communications over the network employ an internet protocol.

15. The computer program of claim 14, wherein the network includes a virtually private network.

16. A method for managing a telemarketing campaign, the method comprising:
a main processing center providing a solicitation file to an automatic dialer at a remotely located solicitation center via a communication link, the solicitation file identifying a plurality of solicitees for a telemarketing campaign;
if the automatic dialer establishes a call with one of the first portion of the solicitees, a console associated with the solicitation center displaying a first script template to be presented during the call to at least a first portion of the solicitees on a page-by-page basis, by, when a first page has been completed at the automatic dialer, overwriting at the automatic dialer the first page with a second page, and by providing the first page of the first script template to the automatic dialer, buffering the second page of the first script template at the main processing center prior to the first page being completed at the automatic dialer and until the first page is completed at the automatic dialer, and in response to requests for subsequent pages of the first script template, overwriting, at the automatic dialer, the first page with the second page;
the solicitation center providing to the main processing center solicitee responses to the first script template received during the call from the first portion of the solicitees and response data to the main processing center via the communication link;
the main processing center analyzing the solicitee responses to the first script template from the first portion of the solicitees and the response data;
based upon the analysis of the solicitee responses to the first script template, the main processing center selecting a second script template from a plurality of script templates to provide to the solicitation center for presentation to a second portion of the solicitees, wherein each script template is identified by a script template identifier; and
using the selected script template to generate a page of script.

17. The method of claim 16, wherein the analyzing the solicitee responses to the first script template from the first portion of the solicitees comprises:
receiving communications over a network, each communication including a solicitee response indicator, wherein for a given communication the solicitee response indicator therein indicates whether a given solicitee has responded to a given solicitation by accepting or rejecting an offer, wherein the given solicitation is related to a given script template of the plurality of script templates;
updating a solicitation response table, wherein the solicitation response table comprises a script template identifier having accumulated solicitee responses associated therewith, wherein responsive to the communication module receiving the given communication, the updating module uses the solicitee response indicator that is included therein to update the accumulated solicitee response associated with the given script template; and
wherein the step of analyzing includes determining statistics related to accumulated solicitee responses for multiple script identifiers.

18. The method of claim 17, further comprising:
providing a user with the statistical information; and
receiving template selection input from the user, wherein the step of selecting includes employing the user supplied template selection input in the selection of the script template.

19. The method of claim 17, wherein the step of selecting further comprises:
receiving statistical information related to accumulated solicitee responses for multiple script identifiers; and
employing the statistical information in the selection of the script template.

20. The method of claim 17, wherein the communications over the network employ an internet protocol.

21. The method of claim 20, wherein the network includes a virtually private network.

22. A system for managing a solicitation campaign, the system comprising:
a first server in communication with a remotely located solicitation center via communication link, wherein the first server provides a solicitation file to an automatic dialer located at the solicitation center which identifies a plurality of solicitees associated with a solicitation campaign and receives solicitee responses from the solicitation center and provides the solicitation center with pages of personalized script to be displayed to an agent and presented to a corresponding solicitee only if a call is established with the solicitee, wherein the solicitee responses include responses by a first portion of the solicitees to a solicitation corresponding to a first script template; and
a second server that receives the solicitee responses from the first portion of the solicitees and analyzes the solicitee responses, the second server determining, based on the analysis of the solicitee responses from the first portion of the solicitees, whether to present the first script template or a second script template to a second portion of the solicitees;
wherein the first server is to present the personalized script on a page-by-page basis, by, when a first page of script has been completed at the remotely located solicitation center, overwriting at the second server the first page with a second page, and by providing first page of the personalized script to the remotely located solicitation center while buffering, at the first server prior to the first page being completed at the remotely located solicitation center, the second page of the personalized script at the first server until the first page is completed at the second server, and upon the first page being completed at second server, overwriting the first page with the second page at the second server.

23. The system of claim 22, wherein the communication link includes a secure communication link.

24. The system of claim 22, wherein the communication link includes a network employing internet protocols.

25. The system of claim 22, wherein the network includes a virtual private network.

26. The system of claim 22, wherein the first and second servers are the same server.

27. The system of claim 22, further including a database having a plurality of scripts stored therein, each script having a script identifier associated therewith.

\* \* \* \* \*